(12) United States Patent
Liao et al.

(10) Patent No.: US 8,201,154 B2
(45) Date of Patent: Jun. 12, 2012

(54) MULTITHREAD DATA PROCESSOR

(75) Inventors: Hongtao Liao, Montigny-le-Bretonneux (FR); Rui Liang Yang, Paris (FR)

(73) Assignee: THOMSON Licensing S.A., Boulogne-Billancourt (FR)

( * ) Notice: Subject to any disclaimer, the term of this patent is extended or adjusted under 35 U.S.C. 154(b) by 1447 days.

(21) Appl. No.: 11/051,038

(22) Filed: Feb. 4, 2005
(Under 37 CFR 1.47)

(65) Prior Publication Data

US 2005/0132400 A1    Jun. 16, 2005

Related U.S. Application Data

(63) Continuation of application No. 09/540,270, filed on Mar. 31, 2000, now abandoned, which is a continuation of application No. PCT/IB98/01627, filed on Oct. 7, 1998.

(30) Foreign Application Priority Data

| | | |
|---|---|---|
| Oct. 7, 1997 | (EP) | 97402361 |
| Oct. 7, 1997 | (EP) | 97402362 |
| Oct. 7, 1997 | (EP) | 97402430 |

(51) Int. Cl.
*G06F 9/45* (2006.01)
*G06F 9/44* (2006.01)

(52) U.S. Cl. ......... 717/139; 717/136; 717/147; 717/114
(58) Field of Classification Search .......... 717/139, 717/136, 147, 114; 348/178, 177; 381/77; 386/353, 355
See application file for complete search history.

(56) References Cited

U.S. PATENT DOCUMENTS

| | | | | | |
|---|---|---|---|---|---|
| 5,063,500 | A | * | 11/1991 | Shorter | 709/226 |
| 5,243,518 | A | * | 9/1993 | Holt et al. | 715/201 |
| 5,428,792 | A | * | 6/1995 | Conner et al. | 717/143 |
| 5,692,198 | A | * | 11/1997 | Ushiku | 712/208 |
| 5,734,907 | A | * | 3/1998 | Jarossay et al. | 717/141 |
| 5,875,335 | A | * | 2/1999 | Beard | 717/139 |
| 5,966,637 | A | * | 10/1999 | Kanungo et al. | 725/132 |
| 5,974,253 | A | * | 10/1999 | Nahaboo et al. | 717/116 |
| 5,978,585 | A | * | 11/1999 | Crelier | 717/145 |
| 7,212,249 | B1 | * | 5/2007 | Casement et al. | 715/716 |
| 7,213,237 | B2 | * | 5/2007 | Kobayashi | 717/139 |
| 2003/0084432 | A1 | * | 5/2003 | Kobayashi | 717/146 |

* cited by examiner

*Primary Examiner* — Qamrun Nahar
(74) *Attorney, Agent, or Firm* — Osha • Liang LLP

(57) ABSTRACT

An apparatus for processing digital audio-visual data including a module class manager configured to evaluate code to determine an interpretative language in which the code is written, wherein the interpretative language is selected from a plurality of interpretative languages, and an interpreter specific to the interpretative language, wherein the interpreter is configured to interpret and execute the code.

18 Claims, 7 Drawing Sheets

US 8,201,154 B2

MULTITHREAD DATA PROCESSOR

CROSS-REFERENCE TO RELATED APPLICATIONS

This application is a continuation application of application Ser. No. 09/540,270 entitled "MULTITHREAD DATA PROCESSOR," filed on Mar. 31, 2000, which is a continuation application of International Application PCT/IB98/01627, filed on Oct. 7, 1998.

FIELD OF THE INVENTION

The invention relates generally to an apparatus for processing digital audio-visual data, in particular a decoder for a digital television system including a multithread data processor.

BACKGROUND OF THE INVENTION

A software based system for controlling a decoder in a digital television system that uses a virtual machine and run time engine for processing digital television data and downloaded applications is described in the PCT application PCT/EP97/02116. This system possesses a number of advantages in comparison with previously known systems for receiver/decoders, notably in regard to the independence of the application layers of the system to the hardware elements of the manufactured decoder through the use of a virtual machine structure.

The system described in this application uses the principle of a single file queue-based structure for controlling and processing events that arise in the system. A number of disadvantages are associated with a queue based structure, including a relatively slow response to high priority events and an inability to efficiently handle a number of concurrent inputs into the system. As described, the system includes a number of process sequencer units. Although the system can prioritize the operation of such sequencers, once a particular process is started, it is not possible to change to another.

These drawbacks of the structure become particularly acute in the case where the receiver/decoder includes an interactive application. For example, the inability of the system to change tasks in response to a priority command combined with the often lengthy time needed to download data can result in the system being locked into one operation despite commands from the user to change to another mode.

There is also a need to simplify the device driver structure of this known system. Communication between the run time engine and the hardware level devices of the known decoder is handled by a plurality of device drivers, the overall organization of which is handled by a device manager which manages the prioritization of event messages and their input into the queue structure of the process sequencer units. As discussed in the application, while the run time engine is provided by the system authority, the device drivers and manager are usually provided by the decoder manufacturer, following the specifications of the system authority.

In this context, the term device is usually used to refer to the interface devices used to process data received by and transmitted by the decoder, such as received via a smart card or via the broadcast flux etc.

Differences in interpretation of the specification by the decoder manufacturer can lead to problems where, for example, the manager does not respect the correct classification of priority events. In such a case, the queuing system will be disrupted as the events supplied to the event filter and process sequencer will be wrongly identified in terms of their priority and will be incorrectly handled by the queuing system.

It is an object of one aspect of the present invention to overcome this problem.

SUMMARY OF THE INVENTION

According to a first aspect of the present invention, there is provided an apparatus for processing digital audio-visual data, the apparatus having at least one associated hardware operating system associated with one or more hardware devices for transmission and reception of data and in which the apparatus further comprises a data processing system including a mufti-thread virtual machine adapted to, inter alia, receive event messages signalled by the hardware operating system and to assign corresponding event objects to one or more threads, and in which a thread including an event object may be suspended during the course of its execution to permit the execution of another thread.

Through the use of a multithread architecture, the present invention thus enables the system to respond effectively to the arrival of events received via the external interfaces of the apparatus, allowing rapid treatment of high priority events during the temporary suspension of non-urgent processes.

In one embodiment, the virtual machine has a pre-emptive multithread architecture, in which a thread is suspended during the course of its execution upon the creation of a thread of higher priority. Whilst this embodiment is preferred for its responsiveness to priority events, other embodiments may be envisaged, such as a time-slice embodiment, in which the virtual machine interrupts execution of a thread at pre-determined periodic intervals to see if another thread to be executed exists.

Preferably, the virtual machine comprises an event manager adapted to respond to an event message signalled by the hardware operating system by storing an event object in one or more threads in a priority organised thread queue.

In this way, the prioritisation of events can be handled directly by the virtual machine, avoiding the problems of the known system, in which events are first ordered for insertion in the processor queue by low level device drivers and managers. As discussed above, the implementation of a driver may be variable from one manufacturer to another. In contrast, in this preferred embodiment, event messages are sorted and prioritised by an event manager within the virtual machine, the characteristics of which are unchangeable from one platform to another.

Notwithstanding the fact that event handling is now effectively carried out by the virtual machine, the system may nevertheless also comprise in certain embodiments one or more device drivers to serve as an interface between the operating system of the virtual machine and the hardware level operating system.

In addition to events arising from the hardware operating system, the event manager may also be configured to respond to event messages arising from within the virtual machine or from higher level applications.

In preferred embodiments, the order of event objects within a thread may also be prioritised according to the priority of the event and/or the arrival time of the event. This may be in addition to the initial prioritisation carried out in the assignment of instructions to threads in the thread queue.

In one implementation, the virtual machine may also comprise a routing table containing information regarding possible event messages and addressable by the event manager to enable the event manager to determine the thread correspondence of a received event message. This routing table may also be used to determine the priority of an event object within a thread. As will be understood by one skilled in the art, alternative means may also be used.

In addition to an event manager and routing table, the virtual machine also preferably comprises a scheduler adapted to examine the threads held in the priority organised thread queue and to command the execution of the thread having the highest priority at that time. In order to implement a pre-emptive thread management operation, the event manager may be adapted to signal the arrival of an event message and to cause the scheduler to examine the new state of the threads held in the thread queue.

A further problem with the system in the PCT application PCT/EP97/02116 described above relates to the treatment of received code. Although the use of the virtual machine and run-time engine permits the system described in this application to be largely independent of the hardware level of the system, the openness of the system is nevertheless limited by the code used to write the applications which sit on top of the virtual machine level in the known system. As described in the application, code is written in an interpretative language, which is downloaded into the receiver from a broadcast centre and interpreted by an interpreter in the virtual machine.

Although the code can be chosen to be a commercially known and standardised language, problems can arise, for example where the receiver has to process applications written in two or more different codes. This problem can arise, for example, where the decoder is introduced in a broadcast system in which the existing decoders in the field are adapted to receive applications written in code different from that used in the present decoder. In such a case, the operator may be obliged to download a given application twice; once as written in the original language for the existing decoders and once as written in the new code for the new decoders. As will be clear, such an operation is relatively inefficient in terms of the use of bandwidth.

It is an object of a further aspect of the present invention to overcome this problem.

According to a second aspect of the present invention, there is provided an apparatus for processing digital audio-visual data comprising one or more hardware devices for transmission and reception of data external of the apparatus, the apparatus further comprising a data processing system including a first virtual machine adapted to, inter alia, receive code written in an interpretative language downloaded via one or more of the hardware devices, said virtual machine being adapted to distinguish between code written in at least two interpretative languages in dependence on the structure of the received code and to pass such code to a corresponding interpreter means for interpretation and execution.

By providing a virtual machine adapted to distinguish between received code together with a plurality of interpreter means for interpreting such code, the present invention avoids the problems associated with the prior art systems and enables the machine to process instructions arriving in different interpretative languages. A fully open system, both in relation to the upper application and lower hardware interfaces may thus be provided.

In one embodiment, the virtual machine distinguishes between interpretative code in at least two interpretative languages based on the characteristics of a header message associated with a module of code in one of the languages. In particular, the virtual machine may distinguish between interpretative code based on the presence or absence of a header message associated with a module of code in one of the languages. Other embodiments can be imagined, where the machine distinguishes between code on the basis of a "flag" or other code element in or at the end of a stream of transmitted code or on the file name of a module of code.

The present invention is particularly applicable to the situation in which one or more of the interpretative languages corresponds to an object oriented language. In such an example, the machine may examine for the presence of a header message associated with a class file in that language.

In order to implement the code, each interpreter means may execute code with reference to one or more function libraries. Preferably, a common function library is shared by a plurality of the interpreter means, in order to reduce the amount of memory needed for the function libraries.

Notwithstanding the presence of a common function library, one or more of the interpreter means may execute code with reference to a function library exclusive to that interpreter. This may be desirable, for example, where certain specialised functions are more easily executed by reference to a dedicated function library. As will be understood, the size of the system may be reduced by using function libraries common to both virtual machines, wherever possible and/or convenient.

A further problem with the system of the PCT application PCT/EP97/02116 described above relates to the handling of the memory used by the system in processing commands. The system described in this application relies on a device manager to manage the memory elements. In this device all calls to the memory from the virtual machine are treated equally. There is furthermore no discussion of how use of memory space may be optimized by the device manager.

The device manager forms part of a layer below the virtual machine and implemented by the manufacturer of the receiver/decoder rather than the system authority. There is therefore also the risk than the implementation chosen by the receiver/decoder manufacturer will be less than optimal as compared to the needs of the higher level elements of the system, such as the virtual machine, designed by the system authority.

It is an object of the present invention in a further aspect to overcome some or all of these problems and to provide an improved system for management of memory within an audio-visual apparatus.

According to a third aspect of the present invention there is provided an apparatus for processing digital audio-visual data comprising a data processing system including a memory and a memory manager for allocating and storing objects in the memory, and in which a first set of objects are allocated by the memory manager with reference to a set of handles, each handle including a reference to the memory address of a corresponding object, and in which a second set of objects are allocated and stored directly in the memory without reference to a handle.

By dividing the memory between objects accessible by a handle and directly retrievable objects, the present invention distinguishes between a first set of objects which may treated in a number of ways by the memory manager to optimise memory space, as will be described below, and those more-frequently accessed objects which can be addressed directly without the need to refer to a handle.

In particular, in one embodiment, an object in the second set may be retrievable directly by other elements in the data processing system without the need to pass via the memory manager. The memory manager may nevertheless be required to allocate and store objects of the second set in the memory in order to maintain control over the memory contents.

In one embodiment, the handles may stored in the memory in question. However, other realisations are possible in which the handles are stored in another memory space. The handles may stored dynamically or in a static array.

In one implementation, the memory manager is adapted to displace objects of the first set within the memory and to change the address reference stored in the corresponding handle accordingly. Objects may be displaced, for example, when no more objects can be stored in the memory. The displacement may be carried out, for example, in accordance with an appropriate compaction algorithm. In this way, free memory space may be optimized whilst keeping track simply and efficiently of stored objects.

In order to allow access at all times of objects of the second type, these objects are preferably non-displaceable within the memory. Other realisations are however imaginable where, for example, displacement of an object of the second type would be associated with a procedure for changing the address of the object where it occurs in the system.

The present invention is particularly applicable to an embodiment where the virtual machine has a multithread architecture of the kind described in relation to the first aspect of the invention, in which a thread may be temporarily suspended during the course of its execution to permit execution of another thread.

In such a case, the multi-thread virtual machine may preferably include an internally generated garbage collector thread, the virtual machine acting upon execution of this thread to free objects in the memory not currently referenced at that time. Alternatively, or additionally, execution of the garbage collector thread may also cause the virtual machine to carry out displacement of objects of the first set according to a compaction algorithm in order to group together the maximum amount of free memory space.

The memory space in question may correspond to the RAM memory of the system, although the present invention applies equally to other memory components, such as FLASH or EEPROM units.

Whilst the present invention is particularly applicable to a decoder for receiving and processing digital television systems, it will be understood that the principles of the data processing system set out in this application may also be applied to other devices for handling digital audio-visual data, such as digital video recorders and the like.

In the context of a decoder for a digital television broadcast, the hardware devices of the decoder can include one or all of the following: an MPEG demultiplexer together with a tuner, a serial interface, a parallel interface, a modem and one or more smart card readers.

The term "receiver/decoder" or "decoder" used herein may connote a receiver for receiving either encoded or non-encoded signals, for example, television and/or radio signals, which may be broadcast or transmitted by some other means. The term may also connote a decoder for decoding received signals. Embodiments of such receiver/decoders may include a decoder integral with the receiver for decoding the received signals, for example, in a "set-top box", a decoder functioning in combination with a physically separate receiver, or a decoder including additional functions, such as a web browser, or a decoder integrated with other devices such as a video recorder or a television.

As used herein, the term "digital transmission system" includes any transmission system for transmitting or broadcasting for example primarily audiovisual or multimedia digital data. Whilst the present invention is particularly applicable to a broadcast digital television system, the invention may also be applicable to a fixed telecommunications network for multimedia internet applications, to a closed circuit television system, and so on.

As used herein, the term "digital television system" includes for example any satellite, terrestrial, cable or other system.

The term MPEG used in the specific description below refers to the data transmission standards developed by the International Standards Organisation working group "Motion Pictures Expert Group" and in particular but not exclusively the MPEG-2 standard developed for digital television applications and set out in the documents ISO 13818-1, ISO 13818-2, ISO 13818-3 and ISO 13818-4. In the context of the present patent application, the term includes all variants, modifications or developments of MPEG formats applicable to the field of digital data transmission.

BRIEF DESCRIPTION OF THE DRAWINGS

There will now be described, by way of example only, an embodiment of the present invention, with reference to the attached figures, in which.

DETAILED DESCRIPTION

Digital Television Network

Figure 1:
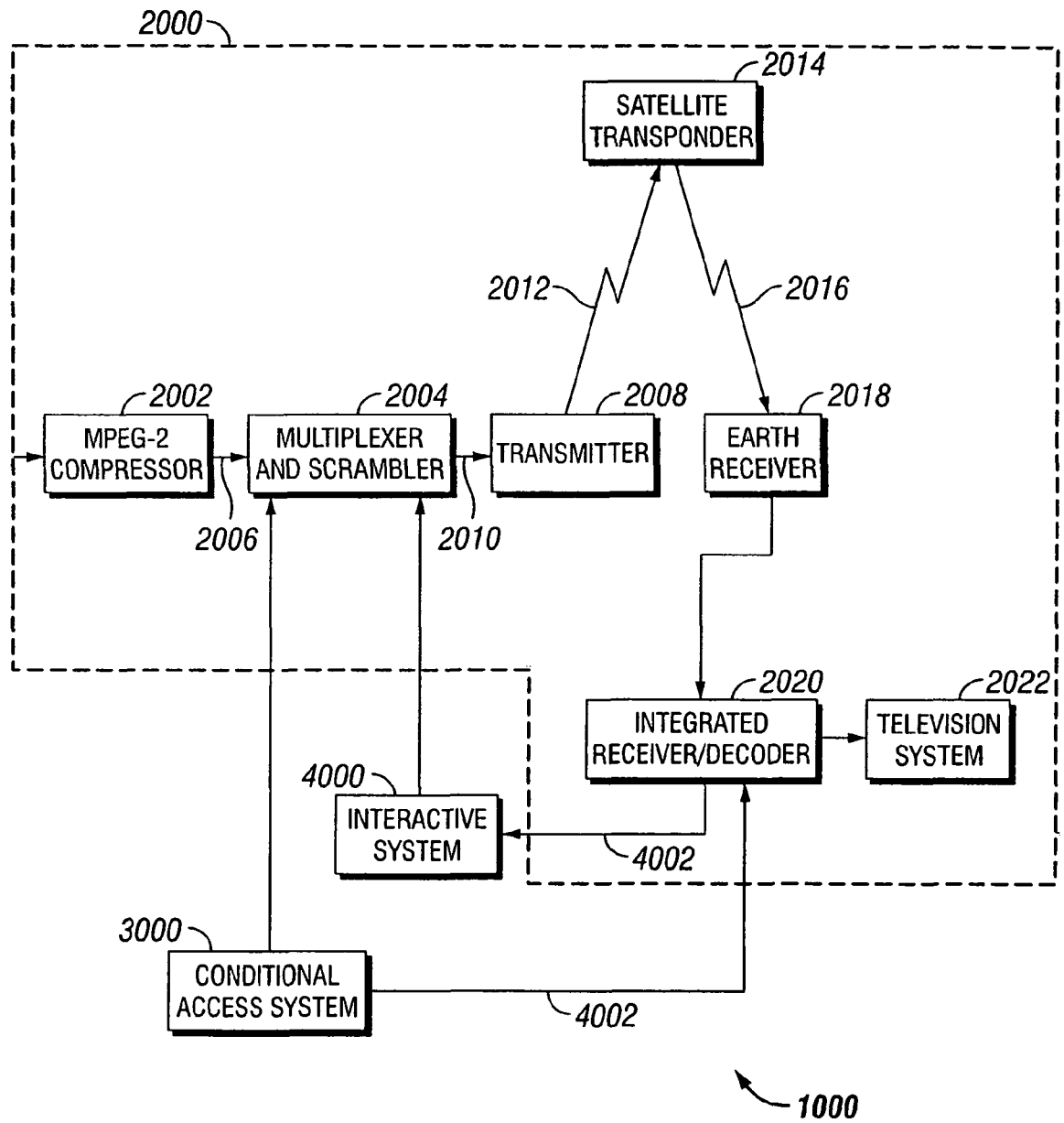
FIG. 1 shows an overall view of a digital television system.

An overview of a digital television system 1000 according to the present invention is shown in FIG. 1. The invention includes a mostly conventional digital television system 2000 that uses the known MPEG-2 compression system to transmit compressed digital signals. In more detail, MPEG-2 compressor 2002 in a broadcast centre receives a digital signal stream (typically a stream of video signals). The compressor 2002 is connected to a multiplexer and scrambler 2004 by linkage 2006.

The multiplexer 2004 receives a plurality of further input signals, assembles one or more transport streams and transmits compressed digital signals to a transmitter 2008 of the broadcast centre via linkage 2010, which can of course take a wide variety of forms including telecommunications links. The transmitter 2008 transmits electromagnetic signals via uplink 2012 towards a satellite transponder 2014, where they are electronically processed and broadcast via notional downlink 2016 to earth receiver 2018, conventionally in the form of a dish owned or rented by the end user. The signals received by receiver 2018 are transmitted to an integrated receiver/decoder 2020 owned or rented by the end user and connected to the end user's television set 2022. The receiver/decoder 2020 decodes the compressed MPEG-2 signal into a television signal for the television set 2022.

A conditional access system 3000 is connected to the multiplexer 2004 and the receiver/decoder 2020, and is located partly in the broadcast centre and partly in the decoder. It enables the end user to access digital television broadcasts from one or more broadcast suppliers. A smartcard, capable of deciphering messages relating to commercial offers (that is, one or several television programmes sold by the broadcast supplier), can be inserted into the receiver/decoder 2020. Using the decoder 2020 and smartcard, the end user may purchase commercial offers in either a subscription mode or a pay-per-view mode.

Interactive System within the Digital Television Network

An interactive system 4000, also connected to the multiplexer 2004 and the receiver/decoder 2020 and again located partly in the broadcast centre and partly in the decoder, enables the end user to interact with various applications via a modemmed back channel 4002.

Figure 2:
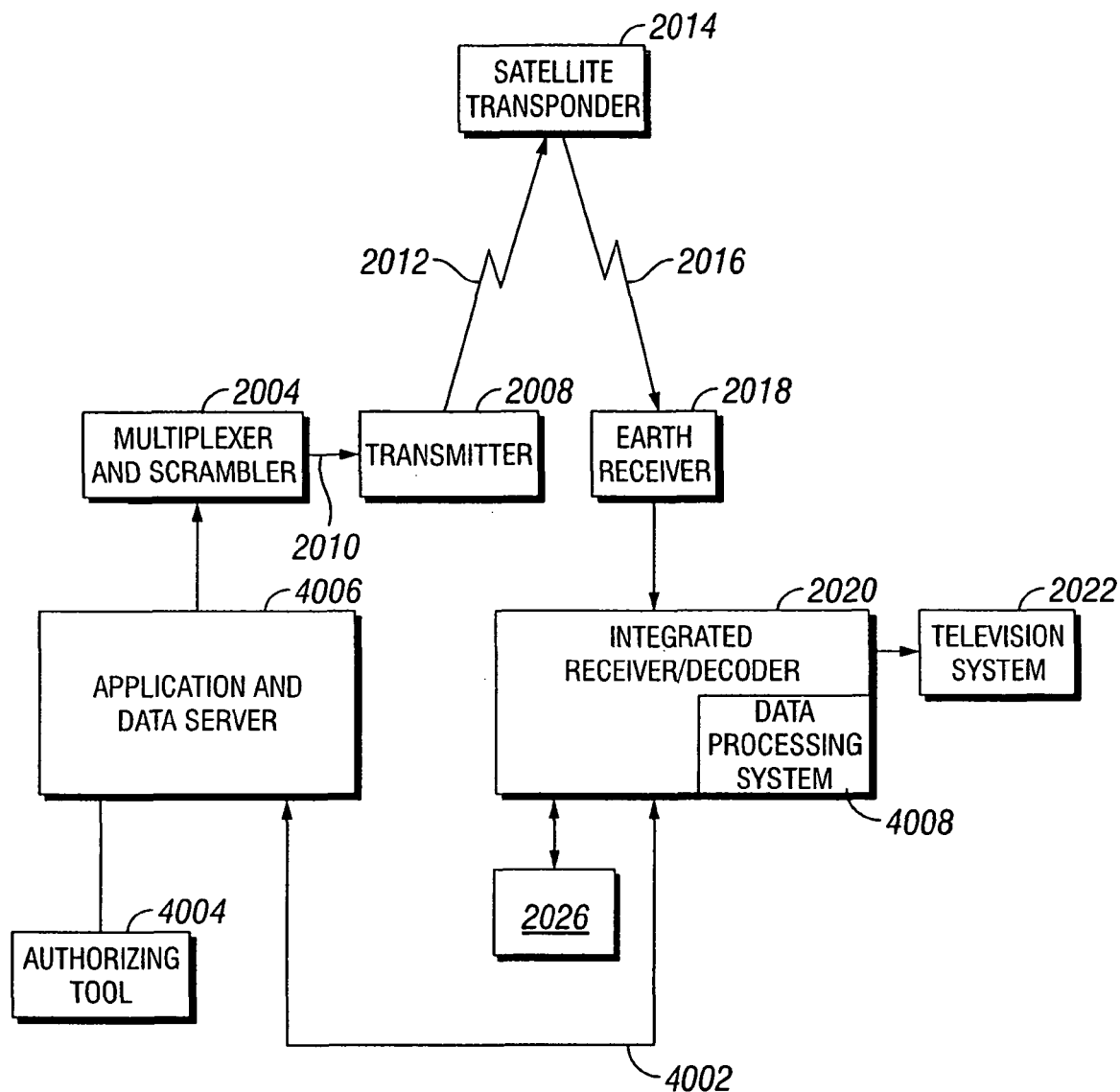
FIG. 2 shows the elements of an interactive system within the digital television system of FIG. 1.

FIG. 2 shows elements of the general architecture of the interactive television system 4000 comprising in overview four main elements:

1. An authoring tool 4004 at the broadcast centre or elsewhere for enabling a broadcast supplier to create, develop, debug and test applications.
2. An application and data server 4006, at the broadcast centre, connected to the authoring tool 4004 for enabling a broadcast supplier to prepare, authenticate and format applications and data for delivery to the multiplexer and scrambler 2004 for insertion into the MPEG-2 transport stream (typically the private section thereof) to be broadcast to the end user.
3. A data processing system 4008 at the receiver/decoder for receiving and processing downloaded applications and data and for managing communication with the other elements of the interactive system and the hardware elements of the receiver/decoder, the system 4008 including a virtual machine with a run time engine (RTE) implemented as executable code installed in the receiver/decoder.
4. A modemmed back channel 4002 between the receiver/decoder 2020 and the application and data server 4006 to communicate signals instructing the server 4006 to insert data and applications into the MPEG-2 transport stream at the request of the end user. Information may also be passed in the other direction.

The receiver/decoder 2020 includes a number of devices for communicating with exterior devices within the interactive system, such as an tuner for tuning the receiver, an MPEG demultiplexer for demultiplexing the MPEG signal, a serial interface, a parallel interface, a modem and one or two card readers adapted to read, for example, credit cards or subscription smart cards issued with the system. The characteristics of such devices are well known in the field of digital television systems and will not be described here in any more detail.

Similarly, the sorts of interactive applications that may be provided (home banking, teleshopping, downloading of computer software) will be apparent to those in the field and will not be described in more detail. While the decoder system architecture described below is particularly apt for interactive applications it will also be appreciated that the architecture described can be used in simpler non-interactive digital TV systems, such as a conventional pay TV system.

Decoder System Architecture

Figure 3:
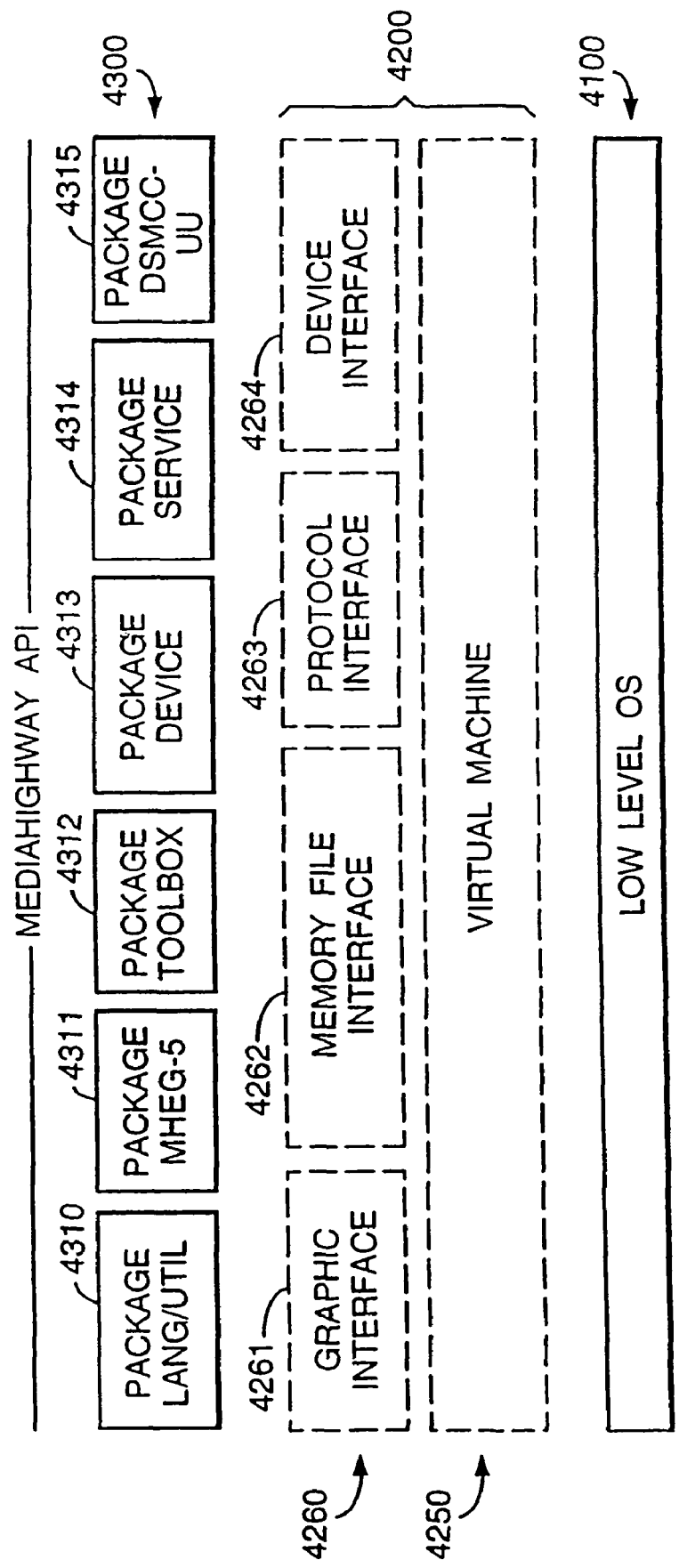
FIG. 3 shows the architecture of the software based system implemented within the receiver/decoder of the present invention.

Turning now to the architecture of the system within the receiver/decoder shown in FIG. 3, it will be seen that a layered architecture is used. The first layer 4100 represents the operating system of the hardware of the receiver/decoder. This is a real-time operating system chosen by the manufacturer to control the hardware elements of the receiver/decoder. The real-time operating system has a relatively fast response time in order to be able to correctly synchronise hardware operations. Event messages are passed between this layer and the middleware layer 4200 immediately above.

The data processing system 4008 sits on top of the hardware operating system and comprises a middleware layer and an application (or more correctly an application interface) layer.

The middleware layer is written in a language such as C ANSI and comprises the elements of a virtual machine 4250 and a number of interfaces 4260 including a graphical Interface 4261, a FLASH/PROM memory interface 4262, a protocol interface 4263 and a device interface 4264.

As with the system set out in patent application PCT/EP97/02116 described in more detail in the introduction, the present invention uses a virtual machine in order to provide independence between upper level applications and the lower level operating system implemented by the manufacturer.

The interlaces 4260 provide the link between operations of the virtual machine and the lower level operating system 4100 and also include a number of intermediate level application modules more easily executed at this level.

The application interface (API) layer 4300 comprises a number of high level packages 4310-4314, written in an object-oriented interpretative language, such as Java. These packages provide an interface between the applications created by the service provider (interactive program guide, teleshopping, internet browser etc) and the virtual machine of the system. Examples of such applications are given below.

The lower level OS is normally embedded in the hardware components of the decoder, although in some realisations, the lower level OS can be downloaded. The middleware and application interface layer packages can be downloaded into the RAM or FLASH memory of the decoder from a broadcast transmission. Alternatively, some or all of the middleware or application interface layer elements can be stored in the ROM or (if present) FLASH memory of the decoder. As will be understood, the physical organisation of the memory elements of the decoder is distinct from the logical organisation of the memory.

Application Interface Layer

Referring to the application interface layer 4300 shown in FIG. 3, and as described above, the packages in this layer are written in an object oriented language such as Java. Each package defines a set of class libraries called on during operation of the system. In the present system the following packages are installed.

Lang/Util Package 4310. These packages define the classes necessary for the manipulation of objects by the virtual machine. These class libraries normally form part of a standard library associated with the object oriented language chosen.

MHEG-5 Package 4311. This package defines the classes associated with the manipulation of graphical objects on the television display. Such objects are distinct from audio-visual data and can make up, for example, channel identifiers or text laid over displayed images. The definition of classes within this package should respect the MHEG-5 norms defined by the standards ETS 300777-3 and ISO/ISE 13522-5 (and the standard ISO/ISE 13522-6 in the case of a Java implemented system).

Toolbox Package 4312. This package contains the classes used for downloading and decompression of information as well as the classes associated with the management of the file system and memory within the receiver/decoder and the classes associated with the connection to the internet etc.

Device Package 4313. This package defines the classes necessary for management of peripherals attached to the receiver/decoder, as discussed above and including the modem, the smart card readers, the MPEG flow tuner etc.

Service Package 4314. This package defines the classes necessary for the implementation of developing higher level interactive applications, such as management of credit card data etc.

DSMCC-UU Package 4315. This package implements the protocols necessary for communication between a client and a server for data file search and reading. Implementation of this package should respect the norm ISO/IEC 13818-6 and directives defined in DAVIC part 9.

A further layer of interactive applications, written by the service provider and downloaded during broadcast as in conventional systems, will be laid over the interface packages defined above. Depending on the applications to be introduced, some of the above packages may be omitted. For example, if the service provider does not intend to provide a common way for data reading, the DSMCC-UU package may be left out of the final system.

The packages 4300 provide class libraries for an object-oriented programming environment. Their class behaviour will depend on the language chosen. In the case of a Java application, for example, a single inheritance class structure will be adhered to.

Interface Layer

As shown, the interface layer is composed of four modules, a graphics module 4261, a memory file management module 4261, a protocol module 4263 and a device manager 4264. Whilst the modules at this level are described as interface modules their function is to provide a "glue" layer for the implementation of the application interface packages and for the operation of the virtual machine generally.

The graphics module 4261, for example, provides the creation and management of graphical objects. It asks the low level OS to display basic graphic shapes such as single pixels, lines, rectangles etc. The implementation of this module depends on the graphics capability of the low level manufacturer's OS. In some ways complementary to the MHEG-5 package 4311, these functions may be more efficiently executed at this code level than in the high level code chosen for the application layer above.

In a similar manner, the memory file management module 4262 includes low level read/write file commands associated with the memory components of the system. Typically, the hardware operating system only includes commands necessary to read/write a sector or page within a memory component. As with the graphics module 4261, this module enables a set of simpler lower level applications to be efficiently introduced in the system.

The protocol management module 4263 defines a library of communication protocols that may be called upon in communications via, for example, the TCP/IP layer of the decoder.

The device manager 4264 is slightly different from the other modules in this layer in that it provides the link or interface between the hardware operating system and the layers above, including the other modules in the interface layer and the virtual machine. Commands or event messages that are received/sent to the hardware OS from the virtual machine, for example, are necessarily passed by the device manager for conversion according to the interface specifications between the two levels.

Virtual Machine Description

Figure 4:
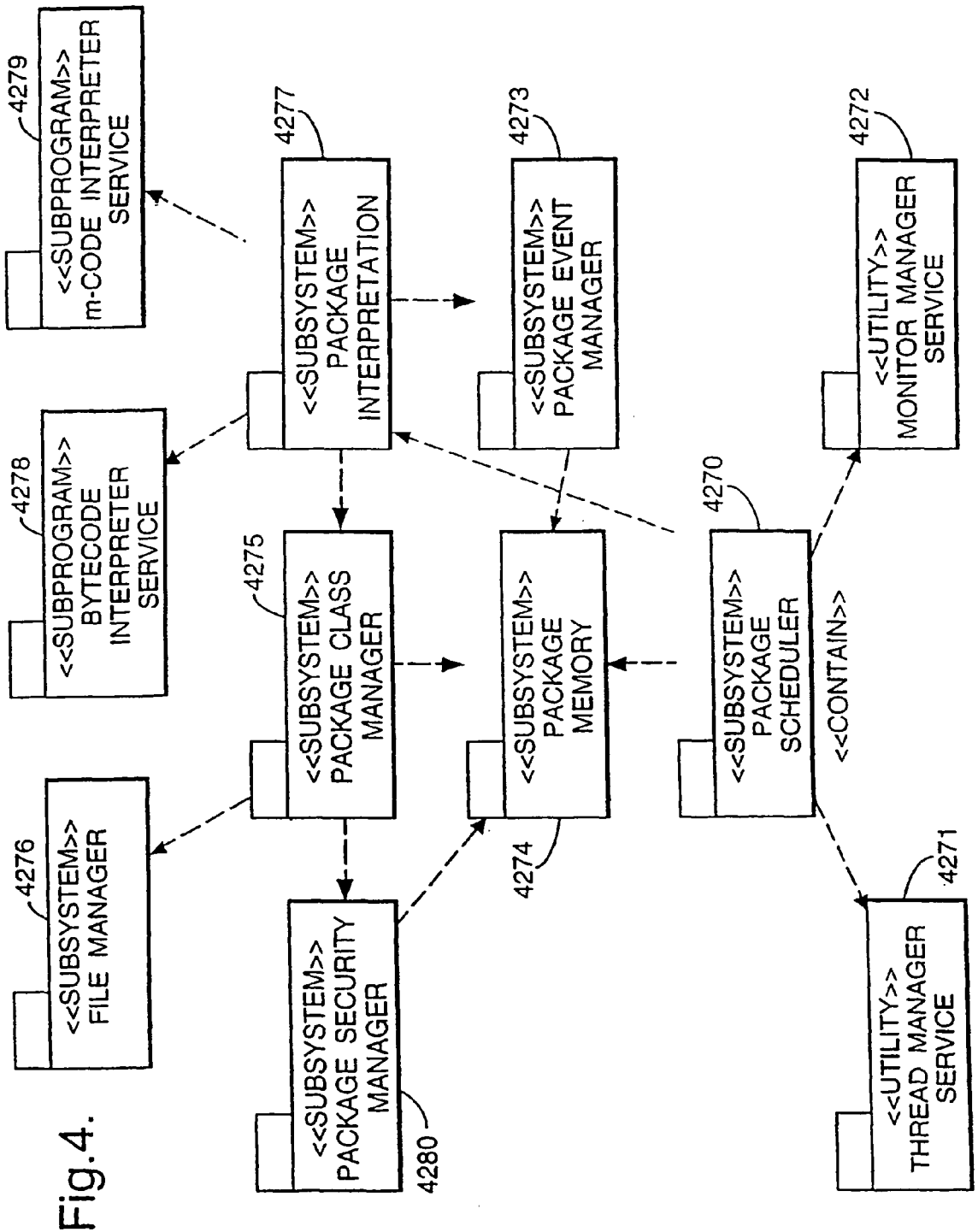
FIG. 4 shows the architecture of the virtual machine within the system of FIG. 3, including in particular an event manager package, an interpretation package and a memory package.

Referring now to FIG. 4, the structure of the virtual machine 4250 used in the system of the present invention will be described. The virtual machine used in the present invention is a pre-emptive multithread type machine. The general characteristics of such a machine are known in other contexts outside of the audio-visual and digital television fields and the following description will focus on those areas that are the most specific to the present application.

The virtual machine is composed of a number of elements, which interact broadly as shown in FIG. 4.

The scheduler 4270 composed of a thread manager service 4271 and a monitor manager service 4272 forms the heart of the multithread machine. The scheduler 4270 orders the execution of threads created by applications externally of the virtual machine and those created by the virtual machine itself (e.g. a garbage collection thread as discussed below).

The event manager 4273 handles an event routing table and the lists of events subscribed to by the threads and centralises the dispatch of event treatments.

The memory manager 4274 handles the allocation and disallocation of the memory zones within the system memory and also handles the removal from the memory of non-referenced objects (garbage collection).

The class manager 4275 charges the classes of the application code downloaded in a broadcast signal, interacting with the security manager 4280 to check the integrity of downloaded code and with the file manager 4276, which implements the applications.

The file manager 4276 carries out the implementation of the system files and the handles the mechanism of downloading of interactive applications and data.

The security manager 4280 handles the level of access permitted to downloaded applications, some applications having the ability to carry out more operations than others in relation to the file system.

The interpreter 4277 comprising a bytecode interpretation service 4278 and a "m-code" interpretation service 4279 handles the interpretation of applications written in these two codes, bytecode being associated with Java applications and m-code being the name given to a proprietary code developed by the applicants. As will be discussed, further interpretation services can be added if desired.

The operation and implementation of the class manager, file manager and security manager may be conventional. The description will now focus on the operation of the interpreter, the scheduler and event manager and the memory manager.

Interpreter

Figure 5:
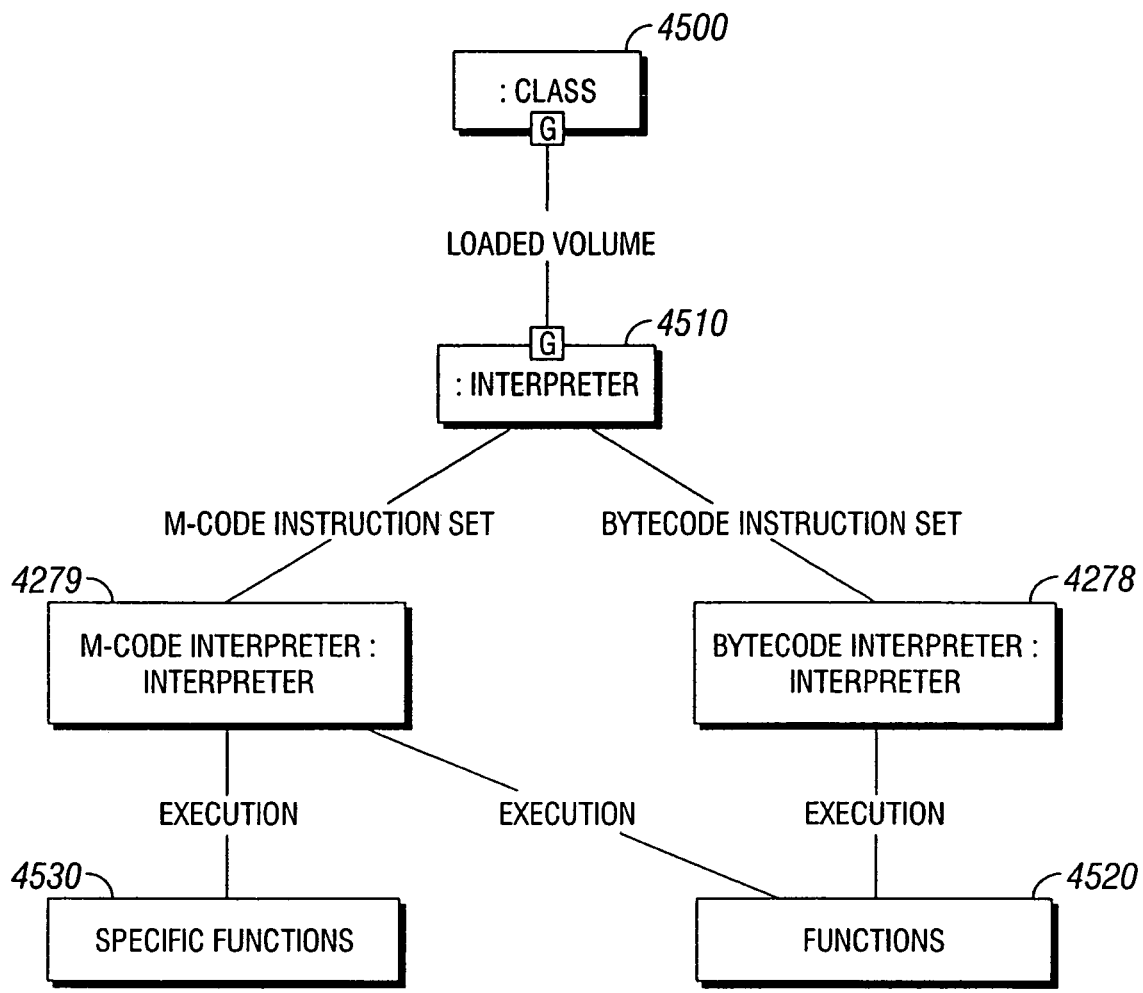
FIG. 5 shows the structure of the interpreter used in the virtual machine.

Referring now to FIG. 5, the operation of the interpreter 4277 used in the embodiment of the present invention will now be described. As discussed in the introduction, the disadvantage of conventional operating systems used in decoders proposed to date has been their reliance on a single type of code for the high level applications. Although the code chosen may be a commercially available and widely known application code, problems can nevertheless arise in the case where it is necessary to maintain a field of a number of decoders using different applications written in a number of codes. The interpreter of the present system permits the interpretation of a number of types of code.

As shown, files arriving in the system, whether bytecode classes or m-code modules are evaluated by the module class manager 4500 according to the structure of the file, such that the application code delivered to the interpreter 4510 has an indication of format. In the case of a bytecode application, for example, the downloaded class file will have a characteristic identification header of 4 octets followed by a version number, also of 4 octets. The interpreter may distinguish between the codes on the basis of the presence or absence of this bytecode header.

In other embodiments, other characteristics of the code types may be used to distinguish between any number of application languages, such as the file name, for example.

Depending on the result of the format indicator, bytecode instructions are sent to the bytecode interpreter 4278, where they are executed with reference to a function library 4520 associated with the byte code instructions, as is conventionally the case with interpretative code instructions. The function library of native code instructions is defined within the virtual machine.

In the case of m-code instructions, these are passed to an m-code interpreter 4279. The majority of the m-code instructions may be implemented and executed with reference to the function library 4520 associated with bytecode instructions, and the interpreter 4279 calls on the library 4520 to execute such m-code functions wherever possible.

In some circumstances, however, some m-code instructions may need specific execution functions not easily executable with reference to a common function library. In such cases, it may be envisaged that the instructions be implemented with reference to a separate function library 4530.

Scheduler and Event Manager

The operation of the scheduler 4270 and event manager 4273 will now be discussed, with reference to FIG. 6 which shows the life of a thread within the system and FIG. 7 which shows the notification of an event to a thread by the system in response to an event signalled by the lower level run-time operating system.

The description will concentrate on the handling of the creation of a thread which represents an execution context in particular resulting from a signalled event. It will be understood that a thread may be created with the initiation of a command generated by a higher level application to be sent to the hardware OS and by the return of this command. A thread may also be created within the virtual machine itself, eg a garbage collection thread.

As mentioned above, the present embodiment relies on a pre-emptive thread handling virtual machine such as that found in Java based systems. In such a machine, a plurality of threads are generated and stored in a thread queue. The scheduler inspects the thread queue and selects the thread with the highest priority to be executed. Normally, the thread that is being executed has the highest priority, but such a thread may be interrupted by a thread of yet a higher priority, as is conventional in pre-emptive threaded systems. In such a case, the state of the interrupted thread is stored and the thread re-activated once it reselected to be executed.

In certain cases, a thread may itself include a so-called "yield" instruction which causes the scheduler to suspend the execution of the thread and to inspect the thread queue for any other threads to execute. The yield instruction may be present in low priority internally generated tasks, such as a garbage collection function carried out by the system in order to remove unused objects from the memory of the system.

Figure 6:
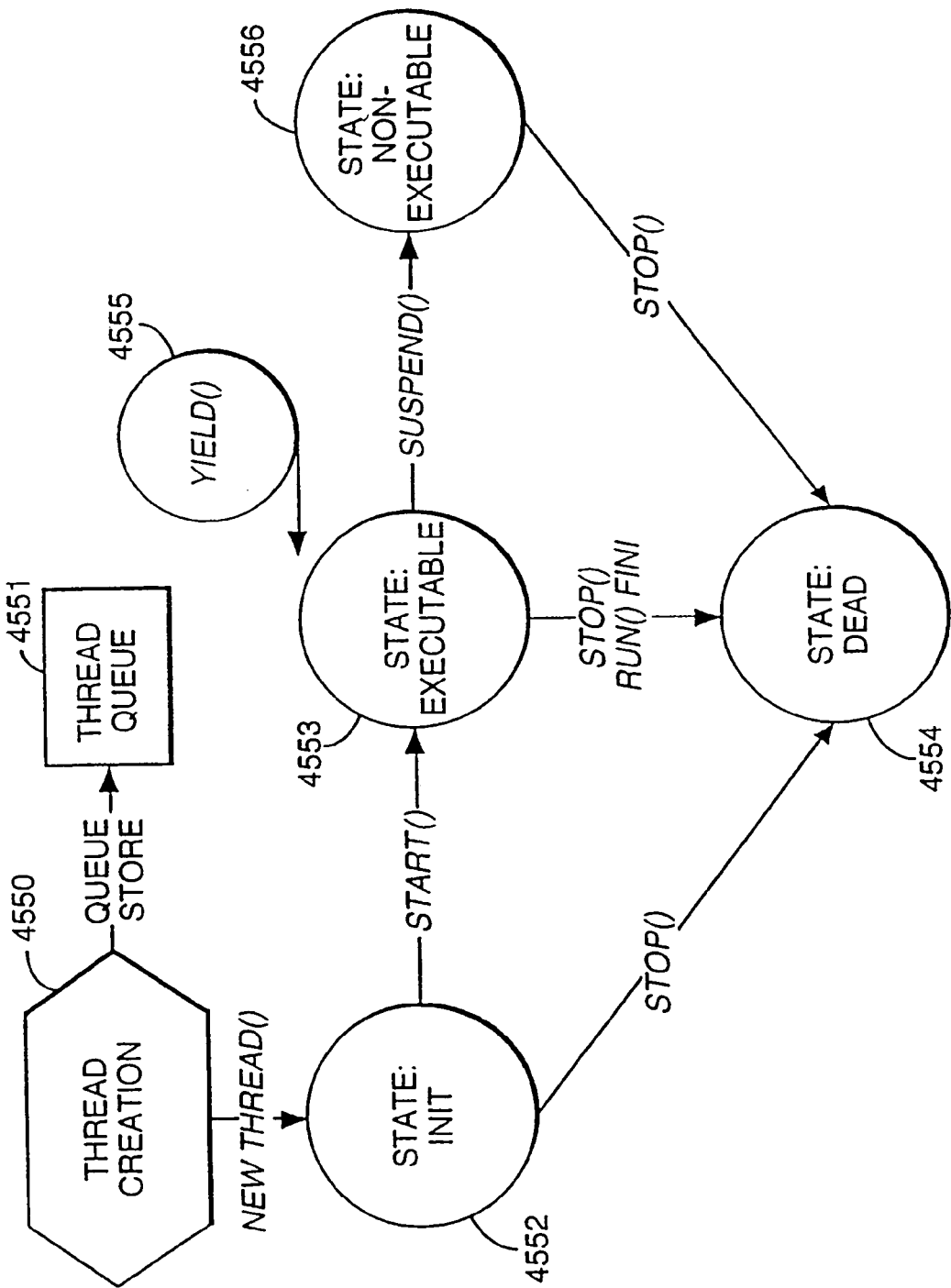
FIG. 6 shows the thread handling within the virtual machine.

These aspects of the system are shown in FIG. 6. The creation of a thread at 4550 gives rise to a thread stored in the thread queue 4551. The newly created thread has the state "init" at 4552. If no other thread has higher priority, the thread is executed by the instruction start( ) and will have the state "executable" at 4553. If the instruction stop( ) is executed in the thread, the thread becomes "dead" at 4554. The thread may equally achieve this state if completed as indicated by the run( )fini instruction. If a yield( ) instruction in the thread itself arises; or a suspend( ) instruction external of the thread is executed, the thread is suspended and given the state "non-executable" at 4556.

Figure 7:
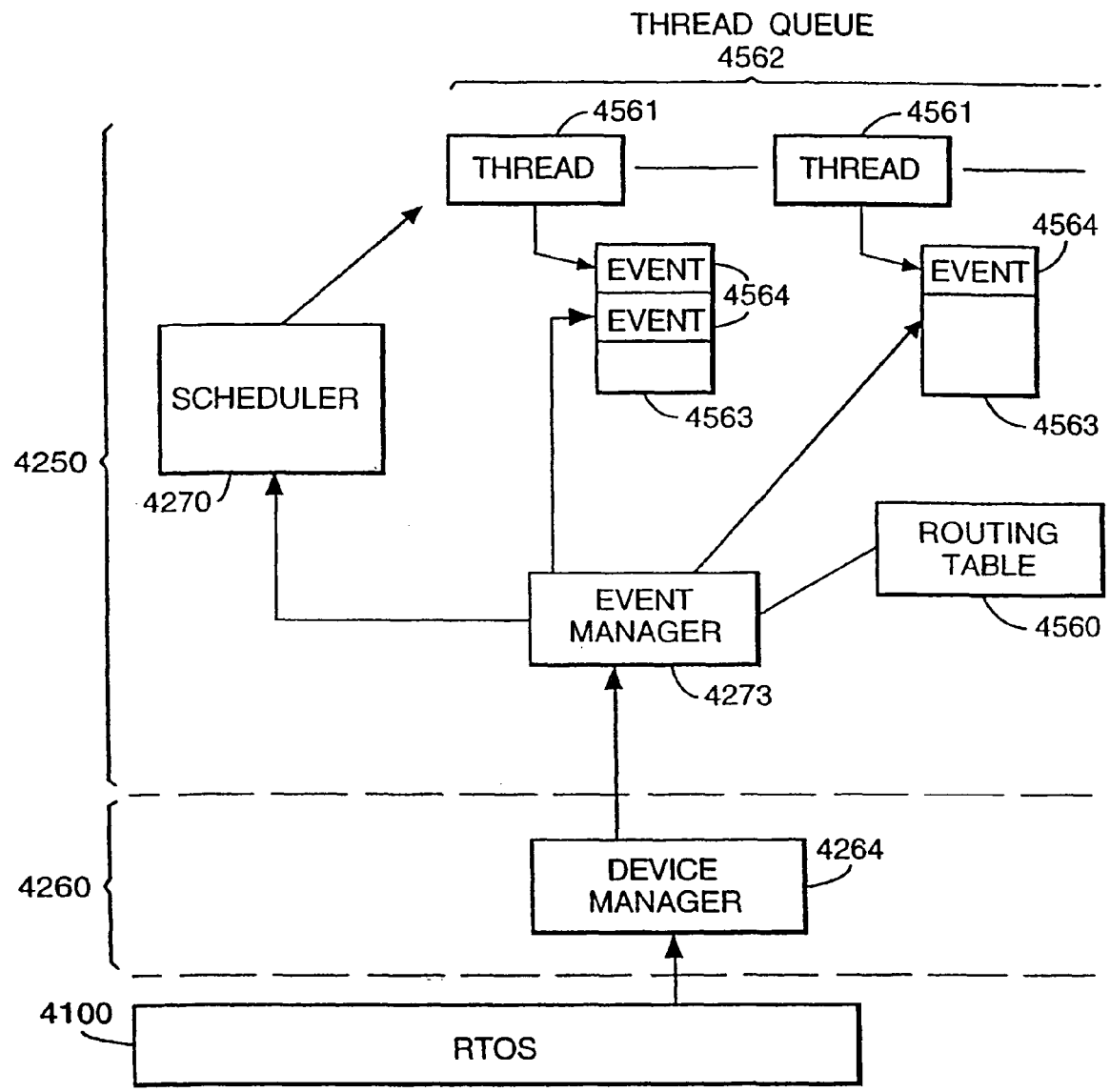
FIG. 7 shows the operation of the event manager and scheduler of the virtual machine.

Referring now to FIG. 7, the interaction between the lower level operating system 4100, the event manager 4273 and the scheduler 4270 will now be described. Raw events signalled by the run-time operating system 4100 are passed via the device manager 4313 to the event manager 4273. In a preferred realisation, some prioritisation of the received events may be carried out by the device manager 4313 and/or the multitask system used in the operating system 4100. However, as will become clear, one of the advantages of the present system lies in the fact that, unlike the system described in PCT/EP97/02116, the handling of events is managed within the virtual machine 4250, thus enabling creator of the middleware layer to achieve complete control over the event handling procedure.

In the present embodiment, events sent via the device manager 4313 are classified by their code and their type. The code identifies the characteristics of the event, for example, in the case of an event generated through operation of a remote control associated with the decoder, the code can identify the button depressed. The type identifies the origin of the event, e.g. the remote control.

Upon receipt of an event signal, the event manager 4273 uses a routing table 4560 to determine the event priority and thread destination and inserts a corresponding event object 4564 into one or more threads 4561 located within the priority based thread queue 4562. One or more event objects 4564 may be stored within a given thread as represented at 4563. The event objects 4564 are stocked within the thread according to their priority classification. Event objects within the thread of an equal priority are classified by their time of arrival (FIFO).

Upon receipt of an event, the event manager 4273 signals its arrival to the scheduler 4270, which then examines the thread queue to see if a thread has a higher priority than the thread currently being executed. If so, the current thread is then suspended as described above and the new thread executed. In this manner a pre-emptive thread handling system is implemented.

In this way, the preferred embodiment allows efficient handling of threads in the decoder so as to permit the system to respond quickly to event calls, even in the case where the system is processing an existing prior event. The disadvantages of the known single processor queue system are thereby overcome.

Whilst the preferred embodiment has been described in relation to a pre-emptive system in which the arrival of an event causes the event manager to signal the scheduler to interrupt execution of a thread, other implementations are possible. For example, in a time-slice system, the scheduler can periodically interrupt execution of a thread to examine the state of the thread queue. Alternatively, the scheduler can be adapted to interrupt execution of a thread to examine the thread queue after each instruction in that the thread is treated.

Memory Manager

As will be appreciated, in the context of receiver/decoder, the management of the memory pool within the system is particularly important, since memory space is relatively restricted as compared to for example, a PC or other hard disk based platform. In the following description, the memory pool corresponds to the memory space within the RAM of the receiver/decoder. However, as mentioned above, the correspondence between the physical and logical organisation of the memory is not exact and the memory pool described below may be located in or shared between other physical memory devices, such as a FLASH memory, an EEPROM etc, within the receiver/decoder.

Figure 8:
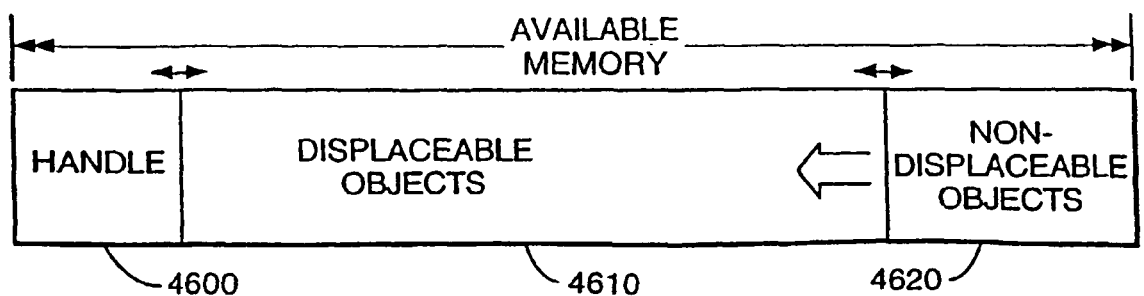
FIG. 8 shows the management of the memory pool by the virtual machine.

Referring now to FIG. 8, this shows the organisation of the available memory in the system. It will be seen that the memory space is shared between a pool of handles 4600, a pool of displaceable objects 4610 and a pool of non-displaceable objects 4620.

Each object in the pool 4610 is identified by and corresponds to a handle stored in the pool 4600. The relation between a handle and its corresponding object is managed by the memory management package 4274 (see FIG. 4) which also controls the access to the pool. All calls to objects in the pool are made by its handle. The boundary between the pools 4600 and 4610 is movable. When a new object is to be stored in memory a handle is created in the pool 4600 including a pointer to the address of the object within the pool 4610. In such a case, the list of handles will be increased by one. The handles are organised in a list formation in the pool to permit compactage by the memory manager.

Objects will be allocated in the pool as needed and according to the space available. In the case that an object allocation is demanded which requires more space in one block than is available, it will be necessary to compact the objects already allocated in the memory. The compaction of the objects in the memory can be carried out according to any known compacting algorithm, for example, a copy-compact algorithm. In the present embodiment, the Mark Sweep compact algorithm is used. In order to compact space, the objects are moved around in the zone 4610, so as to group objects more closely together, avoiding any spaces between adjacent objects. In this way, all free memory space is clustered together in a block so as to allocate for a new object in the pool 4610.

As mentioned above, the memory management package maintains the correspondence between handles in the pool 4600 and objects in the pool 4610 and the new addresses of the objects in the pool will be updated into the equivalent handles for future access.

Whilst the use of handles to access certain objects enables the system to optimise memory location in the pool, the process increases the time needed to access such objects, since it is always necessary to first retrieve the handle in order to look up the address of the object. In certain situations and for objects corresponding to certain designated events a more rapid access time may be required.

In such a case, the objects can be allocated in a pool of non-displaceable objects 4620. The address of such objects is fixed within the pool. There is thus no need for the creation of a handle and the objects are used directly by the system, thereby simplifying the access procedure for these special objects. Again, as with the boundary between the pools 4600 and 4610, the boundary between the pools 4620 and 4610 will be shifted depending on the information stocked in the pool 4620.

In the event, for example, that a non-displaceable object is be allocated to the pool 4620 and there is insufficient space due to the arrangement of displaceable objects in the pool 4610, a compaction of the displaceable objects may be carried out, as described above. Once the objects in the pool are re-organised so as to liberate the maximum amount of space it may then be possible to allocate a non-displaceable block in the pool 4620.

The choice of which objects are displaceable and which objects are non-displaceable is at the discretion of the designer. For example, objects corresponding to the system may be chosen as non-displaceable in view of the importance of these objects, whilst high level application objects may be displaceable. In certain instances, displaceable objects can be temporarily locked into place so as to be considered as non-movable objects.

In order to eliminate unwanted objects from the memory pool the system may also include a so-called garbage collection. This involves the creation of a special garbage collector thread of the lowest priority which will be addressed by the scheduler in the event that no other threads are currently stored in the queue. Upon execution, all displaceable objects currently allocated in the pool that are not being referenced at that time will be freed. The garbage collector thread may also carry out compaction of all other displaceable objects along the lines described above.

The creation of a garbage collector thread is known in the context of other multithread systems used in other applications outside of a digital television system and will not be discussed in any further detail here. However, it will be appreciated that use of a garbage collection procedure in combination with the other memory management techniques described above provides particular advantages in the present context.

What is claimed is:

1. An apparatus for processing digital audio-visual data, comprising:
   a decoder for decoding the digital audio-visual data received at an input of the apparatus and outputting a corresponding audio-visual signal at an output of the apparatus;
   an operating system executing on the apparatus for controlling the decoder; and
   a data processing system for processing the digital audio-visual data and applications downloaded to the apparatus, the applications being coded in one of a plurality of interpretative programming languages,
   wherein the data processing system comprises:
      at least two interpreters, wherein each interpreter is configured to interpret and execute applications coded in one of the plurality of interpretative programming languages; and
      a module class manager configured to evaluate code of a downloaded application for determining the interpretative programming language in which the downloaded application is written, and being adapted to send instructions from the downloaded application to one of the at least two interpreters in dependence on the interpretative programming language in which the downloaded application is written.

2. The apparatus as claimed in claim 1, wherein the module class manager associates a header message with the downloaded application to indicate the interpretative language in which the application is written.

3. The apparatus as claimed in claim 1, wherein at least one of the plurality of interpretative programming languages is an object oriented language.

4. The apparatus as claimed in claim 1, wherein the interpreter executes the application with reference to one or more function libraries.

5. The apparatus as claimed in claim 1, wherein a common function library is shared by a plurality of interpreters, wherein each of the plurality of interpreters is specific to one of the plurality of interpretative languages.

6. The apparatus as claimed in claim 1, wherein the interpreter executes the application with reference to a function library exclusive to the interpreter.

7. The apparatus as claimed in claim 1, wherein said module class manager and said interpreter are components of a decoder for a digital transmission system.

8. The apparatus of claim 7, wherein said module class manager and said interpreter are components of a digital television system.

9. An apparatus for processing digital audio-visual data comprising:

a decoder for decoding the digital audio-visual data received at an input of the apparatus and outputting a corresponding audio-visual signal at an output of the apparatus;

an operating system executing on the apparatus for controlling the decoder, wherein the apparatus further comprises:

a virtual machine configured to:
receive applications written in one of a plurality of interpretative programming languages;
provide at least two interpreters, wherein each interpreter is configured to interpret and execute applications coded in one of the plurality of interpretative programming languages;
determine the interpretative programming language in which each of the received applications is written for one of the received applications; and
send instructions from the one received application to one of the at least two interpreters in dependence on the interpretative programming language in which the one received application is written, wherein the virtual machine executes on a processor.

10. The apparatus of claim 9, wherein determining the interpretative programming language in which the received application is written comprises associating a header to the received application indicating the received application is written in a particular interpretative language.

11. The apparatus of claim 9, wherein interpreting the received application comprises determining a proper interpreter to further process the received application based on a presence or an absence of a header message associated with the code.

12. The apparatus of claim 9, wherein the interpretative programming language in which the received application is written is an object oriented language.

13. The apparatus of claim 12, wherein the virtual machine identifies the received application written in the object oriented language by a presence of a header message associated with a class file in the object oriented language.

14. The apparatus of claim 9, wherein the virtual machine executes the received application with reference to one or more function libraries.

15. The apparatus of claim 9, wherein the virtual machine comprises:
a module class manager configured to indicate the interpretative programming language in which the received application is written to one of a plurality of interpreters,
wherein each of the plurality of interpreters is configured to interpret and execute instructions of the received application, and
wherein each of the plurality of interpreters is adapted to interpret programming instructions written in a different one of the plurality of interpretative languages.

16. The apparatus of claim 15, wherein the module class manager indicates the interpretative language in which the received application is written by associating a header message with the received application.

17. The apparatus of claim 15, wherein the plurality of interpreters execute instructions of the received application with reference to a common function library.

18. The apparatus of claim 9, wherein said virtual machine is a component of a decoder for a digital transmission system.

* * * * *